United States Patent
Quinn

(10) Patent No.: US 8,297,759 B2
(45) Date of Patent: Oct. 30, 2012

(54) DISPLAY DEVICE WITH PULSED LIGHT SOURCE

(75) Inventor: Dermot J. Quinn, Middleton (GB)

(73) Assignee: Digital Projection Limited, Middleton (GB)

( * ) Notice: Subject to any disclaimer, the term of this patent is extended or adjusted under 35 U.S.C. 154(b) by 247 days.

(21) Appl. No.: 12/664,286

(22) PCT Filed: Jun. 12, 2008

(86) PCT No.: PCT/GB2008/002027
§ 371 (c)(1),
(2), (4) Date: Jun. 8, 2010

(87) PCT Pub. No.: WO2008/152397
PCT Pub. Date: Dec. 18, 2008

(65) Prior Publication Data
US 2011/0115989 A1  May 19, 2011

(30) Foreign Application Priority Data
Jun. 13, 2007 (GB) .................................. 0711462.2

(51) Int. Cl.
*G03B 21/28* (2006.01)
(52) U.S. Cl. ............... 353/99; 353/30; 353/31; 353/37; 353/38; 353/98; 353/122; 359/237; 348/742
(58) Field of Classification Search .............. 353/30, 353/31, 37, 38, 85, 98, 99, 122; 348/742, 348/743, 655–658, 70, 68, 268, 270, 755, 348/764, 771, 720; 359/237, 242, 245, 263, 359/264, 290, 291, 292, 295, 298, 223, 230, 359/224.1, 320; 345/84, 108, 205, 208, 690, 345/691, 770, 771, 581, 589, 617
See application file for complete search history.

(56) References Cited

U.S. PATENT DOCUMENTS

| | | | |
|---|---|---|---|
| 5,448,314 A * | 9/1995 | Heimbuch et al. | 348/743 |
| 5,523,803 A * | 6/1996 | Urbanus et al. | 348/771 |
| 5,668,611 A * | 9/1997 | Ernstoff et al. | 348/771 |
| 5,771,116 A * | 6/1998 | Miller et al. | 359/295 |
| 5,777,589 A * | 7/1998 | Gale et al. | 345/84 |
| 6,217,174 B1 * | 4/2001 | Knox | 353/31 |
| 6,590,549 B1 * | 7/2003 | Marshall | 345/84 |
| 6,891,657 B2 * | 5/2005 | Hewlett et al. | 359/291 |
| 7,076,110 B2 * | 7/2006 | Kempf | 382/252 |
| 7,604,356 B2 * | 10/2009 | Kubo | 353/84 |
| 7,847,809 B2 * | 12/2010 | Inazumi | 345/690 |
| 2005/0007563 A1 * | 1/2005 | Yamazaki et al. | 353/98 |
| 2005/0185250 A1 * | 8/2005 | Novotny et al. | 359/291 |
| 2005/0275959 A1 * | 12/2005 | Kawaai et al. | 359/834 |
| 2007/0035723 A1 | 2/2007 | Takeda et al. | |
| 2008/0151195 A1 * | 6/2008 | Pacheco et al. | 353/30 |

FOREIGN PATENT DOCUMENTS

| | | |
|---|---|---|
| EP | 1280361 | 1/2003 |
| WO | 9115843 | 10/1991 |
| WO | 9326034 | 12/1993 |
| WO | 9409473 | 4/1994 |
| WO | 9522868 | 8/1995 |
| WO | 9528696 | 10/1995 |

* cited by examiner

*Primary Examiner* — Georgia Y Epps
*Assistant Examiner* — Sultan Chowdhury
(74) *Attorney, Agent, or Firm* — Fogg & Powers LLC

(57) ABSTRACT

A display system comprising a light source and a plurality of switchable elements, wherein each element is switchable at an element switching frequency in accordance with an element control signal between an "on" state in which light is directed from the light source onto a display, and an "off" state in which light is not directed onto a display. The light source being configured to generate a pulsed light source output at a light source pulse frequency.

26 Claims, 8 Drawing Sheets

DISPLAY DEVICE WITH PULSED LIGHT SOURCE

FIELD OF THE INVENTION

This application claims priority to International Patent Application No. PCT/GB08/002027 filed Jun. 12, 2008, which claims priority to Patent Application No. GB 0711462.2 filed on Jun. 13, 2007.

BACKGROUND OF THE INVENTION

This invention relates to display devices. In particular, but not exclusively to display devices including an array of switchable elements, each switchable element being switchable between at least two states, the form of the image being displayed by the display device being dependent on which state each switchable element is in.

WO 94/09473 (Rank Brimar Limited) discloses a display device that includes an array of switchable elements such as deformable mirror devices.

Each switchable element of the device is effective to switch the light passing from the element to the displayed image either "on" or "off" so as to produce "white" or "black" pixels on the displayed image. It is, however, possible to display grey scale images by controlling the time for which each switchable element of the device is in a state such that light from the element arrives at the displayed image, and using the integrating response of the human eye of an observer who will perceive a grey scale image from the element.

An example of such an arrangement is described in GB 2014822 which discloses a display device incorporating an X-Y array of energizable light emitting devices. The display device described in GB 2014822 takes data in binary digital forms, for example via 8 bit signals, the device being driven a line at a time in a number of periods during which the modulators may be "on" or "off". The "on"/"off" state of each pixel during each time period is determined by the state of a corresponding bit of the digital input data.

By varying the ratio of the "on" period to the "off" period, grey scale can be achieved. This may be known as a temporal modulation technique.

An example bit pattern 100 that can be used to control an element to generate the darkest possible shade of off-black colour for a pixel for two consecutive frames is shown as FIG. 1. In this embodiment, the bit pattern 100 comprises two 8 bit words 102, 104, wherein the first 8 bit word 102 controls the state of a pixel for a first frame and the second 8 bit word 104 controls the state of the pixel for a second frame. In this prior art embodiment, the minimum ratio of "on-time" to "off-time" is 1:7.

For convenience of illustration, a relatively short bit pattern 100 is shown in FIG. 1, and it will be appreciated that bit patterns 100 of any length can be used.

In some prior art systems, the minimum ratio of an element "on-time" to "off-time" can be decreased by controlling the position of the element for two consecutive frames with a single bit pattern. As shown in FIG. 2, a minimum ratio of "on-time" to "off-time" of 1:15 can be obtained by enabling the position of an element to be controlled for a period of time associated with two frames. In this example, in order to generate the darkest possible grey scale (that is not black) the element is "on" for the period represented by one bit over a period represented by two consecutive frames (16 bits).

This can increase the level of grey scale for dark colours (that is when an element is "on" for a short period of time) as there is an additional shade of grey scale between an element being completely off and an element being on for a period of time associated with a single bit in a single frame. Such systems may be known in the art as utilising "partial bits" and may be considered as able to generate "less dense" light.

However, spreading light unevenly over two frames in this way can lead to a flicker in the images as the element switches on and off less frequently and this may be detectable by the human eye. This can lead to a perceived reduction in the quality of the images.

SUMMARY

Embodiments of the invention were devised with the foregoing in mind.

According to a first aspect of the invention there is provided a display system comprising a light source and a plurality of switchable elements wherein each element is switchable in accordance with an element control signal between an "on" state in which light is directed from the light source onto a display, and an "off" state in which light is not directed onto a display, wherein an element switching frequency is defined by the frequency with which an element can switch between the "on" and the "off" states in accordance with the element control signal, characterised in that the light source is configured to generate a pulsed light source output at a light source pulse frequency.

The element switching frequency may be defined by the maximum frequency with which an element can switch between the "on" and the "off" states in accordance with the element control signal.

Using a pulsed light source output can increase the grey scale resolution of an image that is displayed on a display screen, particularly for dark grey scale colours where grey scale resolution is more discernible to the human eye. Increasing the grey scale resolution in this way can reduce on-screen noise and imperfections (which may be referred to as "artefacts") in displayed images when compared with images displayed by systems that use known temporal and spatial modulation techniques to increase grey scale resolution.

The light source pulse frequency may be different to the element switching frequency. The light source pulse frequency may be greater than the element switching frequency or less than the element switching frequency.

The instantaneous phase difference between the pulsed light source output and the element control signal may change over time. The characteristics (such as the frequency, timing, mark-space ratio, amplitude, frequency, etc.) of the pulsed light source output may be independent of the characteristics of the element control signal. The number of light source output pulses reflected by an element while it is in the "on" state for a predetermined time may not be the same for each occasion that the element is in the "on" state for that predetermined time. The predetermined time may be the time represented by one or more bits of the element control signal.

Systems that are configured to generate an inconsistently reproducible number of light source output pulses whilst an element is in the "on" state can take advantage of the statistical likelihood that a light source output pulse will coincide with the time that the element is in the "on" state in order to reduce the average light reflected while the element is in the "on" state. This can improve the grey scale resolution of images displayed by the display system.

In some embodiments, the pulsed light source output may be phase locked to the element control signal and this can provide that the amount of light reflected whilst an element is in the "on" state is consistently reproducible.

The element control signal may comprise a bit field having "on" bits and "off" bits, and the system may be configured to replace consecutive "on" bits in the element control signal with spaced apart "on" bits, and this may reduce the time that an element is continuously on. Reducing the time that an element is continuously on can take advantage of the increase in grey scale resolution that is provided for dark shades of grey when the element is on consecutively for short periods of time.

The light source may be configured to receive a luminance signal representative of a brightness value of an image to be displayed and to modulate the pulsed light output in accordance with the luminance signal, and/or the pulsed light output may be modulated in accordance with the element control signal. This can enable the grey scale resolution of an image that is displayed to be increased in the dynamic range of shades of grey that are perceptible to a human eye viewing the image.

Dynamic range is a term used in the technical field of optics to describe the ratio between the smallest and largest possible values of light that the human eye can detect, and is discussed in more detail below.

The system may be configured to adjust one or more of the frequency, mark-space ratio, and intensity of the pulsed light output to modulate the pulsed light source output.

The light source may be configured to generate more light per unit time for an image that has a brightness value above a threshold than for an image that has a brightness value below a threshold value.

The system may be configured to modulate the pulsed light source output to perform a gamma decoding operation on a received video signal. This may provide a reduction in video signal processing that is required, and may enable a display system to be provided that does not require a gamma-decoding processing component.

The plurality of switchable elements may be an array of switchable elements, which may be a deflectable mirror device (DMD).

BRIEF DESCRIPTION OF THE DRAWINGS

A number of embodiments of a display system in accordance with the invention will now be described by way of example only, with reference to the accompanying figures in which.

DETAILED DESCRIPTION

Embodiments of the invention use a pulsed light source to illuminate one or more deflectable mirror devices (DMDs) in order to display an image on a screen. Using a pulsed light source enables a greater resolution in grey scale to be achieved when compared with systems that use continuous light sources, and the effects of this greater resolution can be particularly noticeable for dark colours where individual mirror elements of the DMD are only switched on to reflect light for a short period of time.

It will be appreciated that the term grey scale does not only relate to colours between black and white, but that in this context relates to shades of red, green and blue, or any other colour.

A display device according to an embodiment of the invention may utilise the statistical likelihood that the pulsed light output of an illuminating source will coincide with the minimum on-time of a light modulator such that a reduced average minimum bit weighting can be provided thereby improving the grey scale resolution of images displayed by the display device.

Further control of the resolution in grey scale can be obtained: by synchronising/phase locking the pulsed light source with a digital control signal that is used to turn the mirror elements on and off; and/or by controlling the frequency and/or mark-space ratio of the pulsed light source in accordance with the luminance of an image that is to be displayed; and/or by manipulating a digital control signal to decrease the length of time that a mirror is continuously in an "on" position. Shorter mirror on-times may provide an improvement in grey scale resolution.

Figure 1:
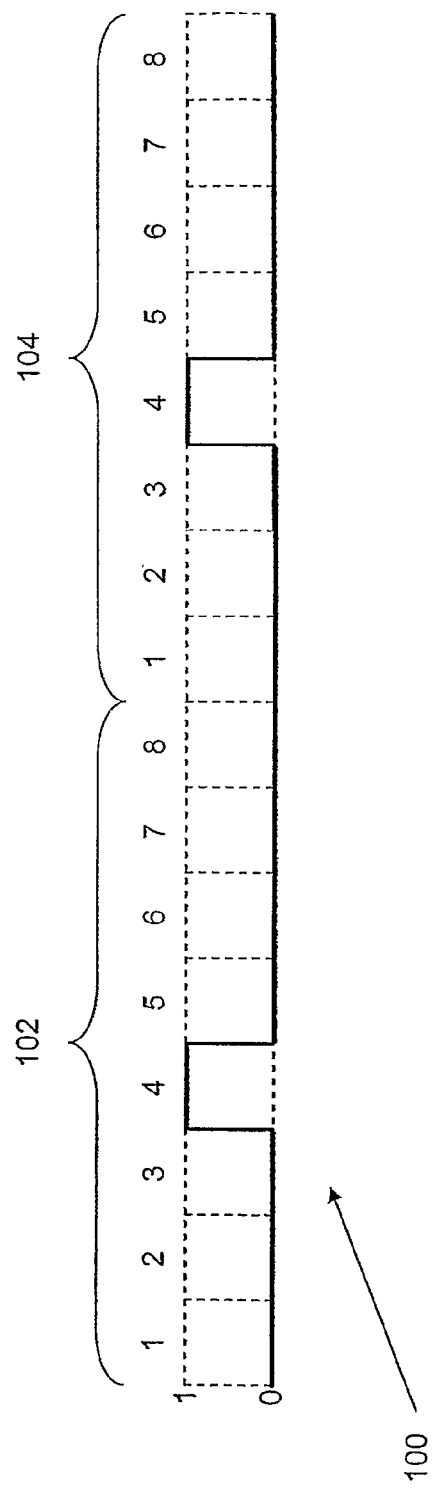
FIGS. 1 and 2 illustrate prior art examples of bit patterns that are used to control a switchable element of a display device.
Figure 2:
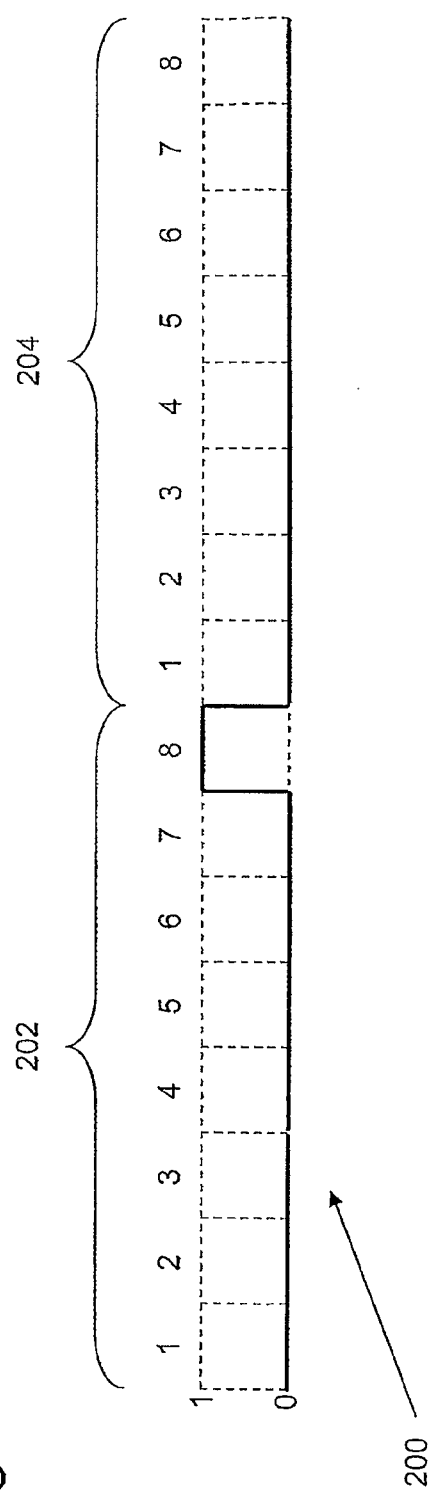
Figure 3:
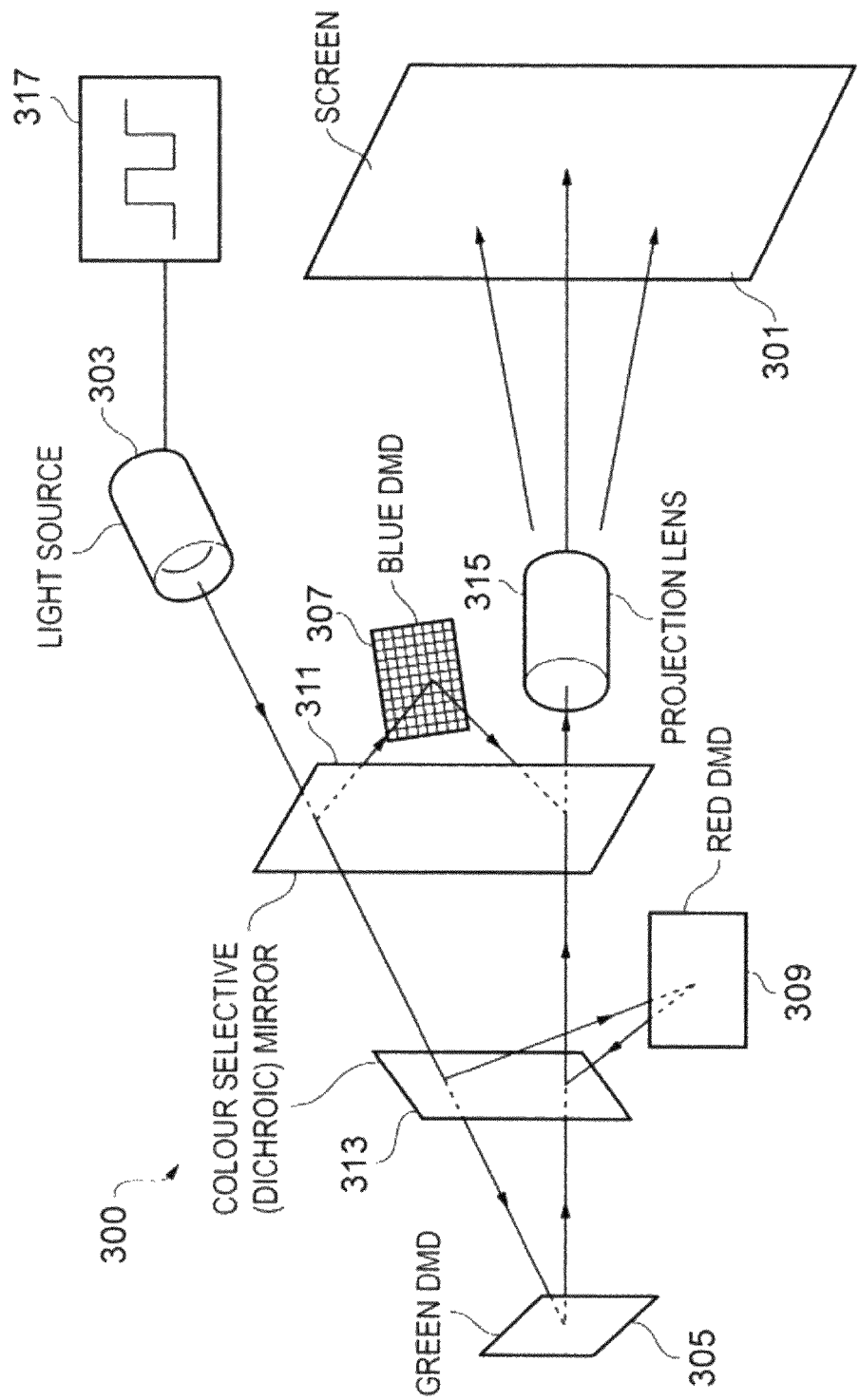
FIG. 3 is a schematic diagram of a display system according to an embodiment of the invention.

FIG. 3 shows an embodiment of a display system 300 according to an embodiment of the invention to project a colour image onto a display screen 301.

The display system 300 includes a light source 303, the output of which is controlled by a square-wave oscillator 317 such that the light source 303 generates a pulsed light output. The light source 303 is arranged such that the beam from the source 303 is directed onto three planar deflectable mirror display devices 305, 307, 309 as will now be described.

Positioned in the light path between the light source 303 and the first deflectable mirror device 305 are two dichroic mirrors 311, 313. The first dichroic mirror 311 is designed and angled to reflect blue light onto the second planar deflectable mirror display device 307 and transmit all other incident light. The second dichroic mirror 313 is designed and angled so as to reflect red light onto the third planar deflectable mirror device 309 and transmit the remaining green component of the light from the source 303 onto the first deflectable mirror display device 305.

The three deflectable mirror devices 305, 307, 309 are arranged to be capable of reflecting the three colour components of the beam from the source 303 so as to direct the spatially modulated beam through a projection lens 315 onto the display screen 301.

Figure 4:
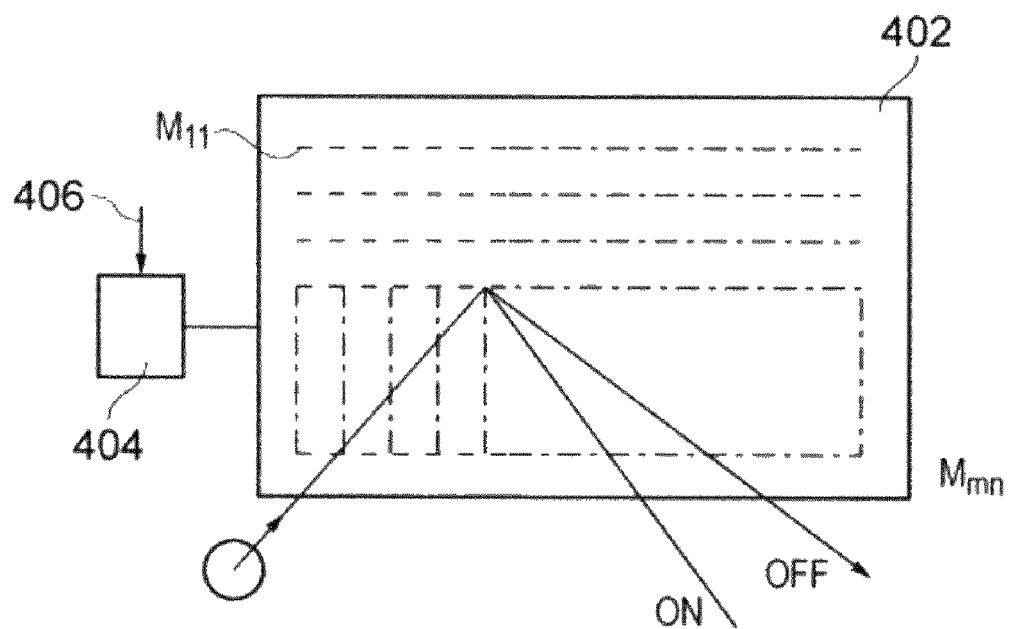
FIG. 4 is a schematic diagram of a spatial light modulator array incorporated in the system of FIG. 3.
Figure 5:
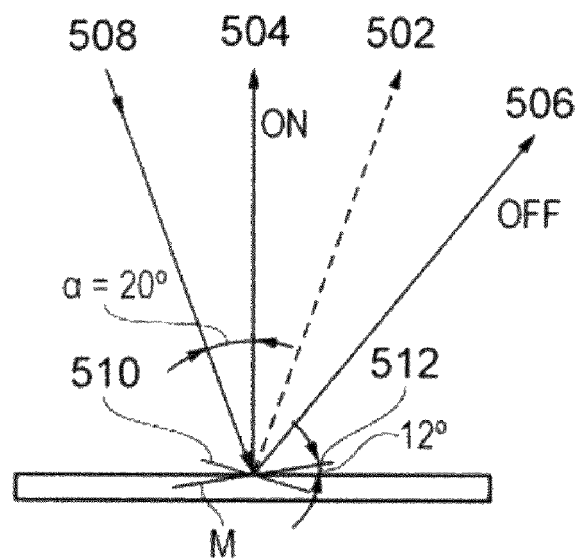
FIG. 5 illustrates the illumination of a mirror element in the array of FIG. 4.

Referring now also to FIGS. 4 and 5, each deflectable mirror device (DMD) 305, 307, 309 comprises an array 402 of m×n deflectable/switchable mirror elements M, typically 768×576 mirror elements for a low resolution display system or 2048×1152 mirror elements for a high resolution display system.

Each array 402 is connected to a driver circuit 404 which provides a control signal to each of the mirror elements $M_{11}$-$M_{mn}$ on the array 402. The signal provided to each of the mirror elements $M_{11}$-$M_{mn}$ is configured to cause each mirror element M to take one of two different positions corresponding to an "on" state in which the reflected light is directed in a first path 504 and an "off" state in which the reflected light is directed in a second path 506. The second path 506 is chosen such that light reflected along this direction is directed away from the optical axis of the display system and thus does not pass into the projection lens 315 and subsequently onto the display screen 301.

Each DMD array 402 is capable of representing a two dimensional image, those mirror elements M which are tilted to the "on" state appearing bright and those which are tilted to the "off" state appearing dark. By varying the ratio of the "on" period to "off" period, for example by a temporal modulation technique, grey scale can be achieved.

Turning now particularly to FIG. 5, the angle through which each mirror element M is deflected between the "on" state and the "off" state is relatively small.

Thus in order to achieve good discrimination between the "on" and "off" states the incident light beam 508 from the source 303 is directed towards each spatial light modulator 305, 307, 309 at an angle measured from the normal to each device of around 24°.

When an individual mirror element M is lying parallel to the plane of the array 402, the incident beam 508 is reflected at a corresponding angle of 24° to the normal along an "off" path 502 into a beam dump (not shown). When the control signal from the driver circuit 404 sets a mirror element M into a first deflection state 510 at a first angle to the plane of the array 402, the incident beam 508 is reflected along the direction 506 in a further "off" path into the beam dump. When the control signal from the driver circuit 404 sets a mirror element M into a second deflection state 512 at a second angle to the plane of the array 402, the incident beam 508 is reflected along the normal to the array along the "on" path 504. The mirror element M is on when the mirror element M is in the second deflection state 512.

A video or graphics source signal is received at the driver circuit 404. The video source signal provides a representation of a pre-recorded or live video stream of images that are to be displayed on screen 301.

The driver circuit 404 is configured to process each frame of the received video or graphics source signal and generate a control signal for each DMD element for each frame of the received video or graphics source signal. The control signals are configured to switch the individual mirror elements in each of the respective DMD's 305, 307, 309 on and off such that the light that is reflected onto the screen 301 causes images to be displayed on the display screen 301. In this embodiment, the control signals comprise a bit field for each mirror element of each DMD 305, 307, 309.

The driver circuit 404 is configured to perform bit sequence generation by converting a representation of a grey scale value for each pixel in the image to be displayed into a binary bit field that is used to switch the mirror element associated with a pixel on and off. The mirror elements are switched on and off such that the light directed from the mirror elements onto the screen 301 causes images to be displayed.

The driver circuit 404 may also be configured to perform one or more of the following operations depending upon the properties of the received video or graphics source signal: analogue to digital conversion, synchronisation detection, de-interlacing, re-sizing, and gamma decoding. These optional features of the driver circuit 404 are described in relation to FIG. 8.

Each bit within a binary field control signal generated by the driver circuit 404 represents the minimum period of time that a mirror can remain switched on (or off) and in this embodiment defines a mirror element switching frequency. This minimum period of time is a temporal sub-division of a frame that is to be displayed.

For example, in an embodiment with a video stream having a frame rate of 24 Hertz, a single frame is displayed for 0.0417 seconds (1/24 Hz). In the same example, a binary field control signal with a bit length of 60 bits is used to control the mirror elements, and in this example each of the bits represents an equal temporal sub-division of the frame. Therefore, each bit within the binary field represents 1 sixtieth of a frame, which in this example is 0.7 milliseconds (0.0417/60). The minimum period of time that a mirror element can remain switched on when generating a grey scale colour component is about 0.7 milliseconds which corresponds to a mirror element switching frequency of 1.44 KHz (1/0.07 milliseconds).

In some embodiments, the minimum period of time that the mirror element can be switched on is not short enough in order to provide acceptable colour resolution when used with a continuous light source, such as in the prior art systems described above. The unacceptable colour resolution can be particularly noticeable close to "black level" where the differences in the amount of time that the mirror element is on between successive grey scale shades represents a large proportion of the total time the mirror element is on.

In other examples, each of the bits in the binary field control signal does not necessarily represent an equal temporal sub-division of a single frame, and this can enable a reduced minimum period of time that a mirror element can be switched on to be achieved.

However, the minimum period of time for which a mirror element can be switched on may be restricted by the mechanical properties of the DMD as the position of the mirror is changed from "on" to "off" and vice versa. This minimum period of time, which defines a mirror element switching frequency, may be too long to generate acceptable colour resolution in prior art systems that use a continuous light source.

In the embodiment of the invention illustrated in FIG. 3, the output of the light source 303 is controlled by a square-wave oscillator 317 such that the light source 303 generates a pulsed light source output. Using a pulsed light source output causes the amount of light that is reflected whilst an individual mirror element of a DMD array 305, 307, 309 is in the "on" position to be reduced when compared with a system that has a continuous light source. This increases the resolution of the attainable grey scale as the difference in the amount of light that is reflected for successive grey scale shades is also reduced.

Display systems according to one or more embodiments of the invention can provide an improved grey scale resolution with reduced noise and artefacts in displayed images when compared with prior art systems, and it will be appreciated that the invention is not necessarily limited to use with deflectable mirror devices (DMD's), but can also be used with other types of display devices.

Figure 6:
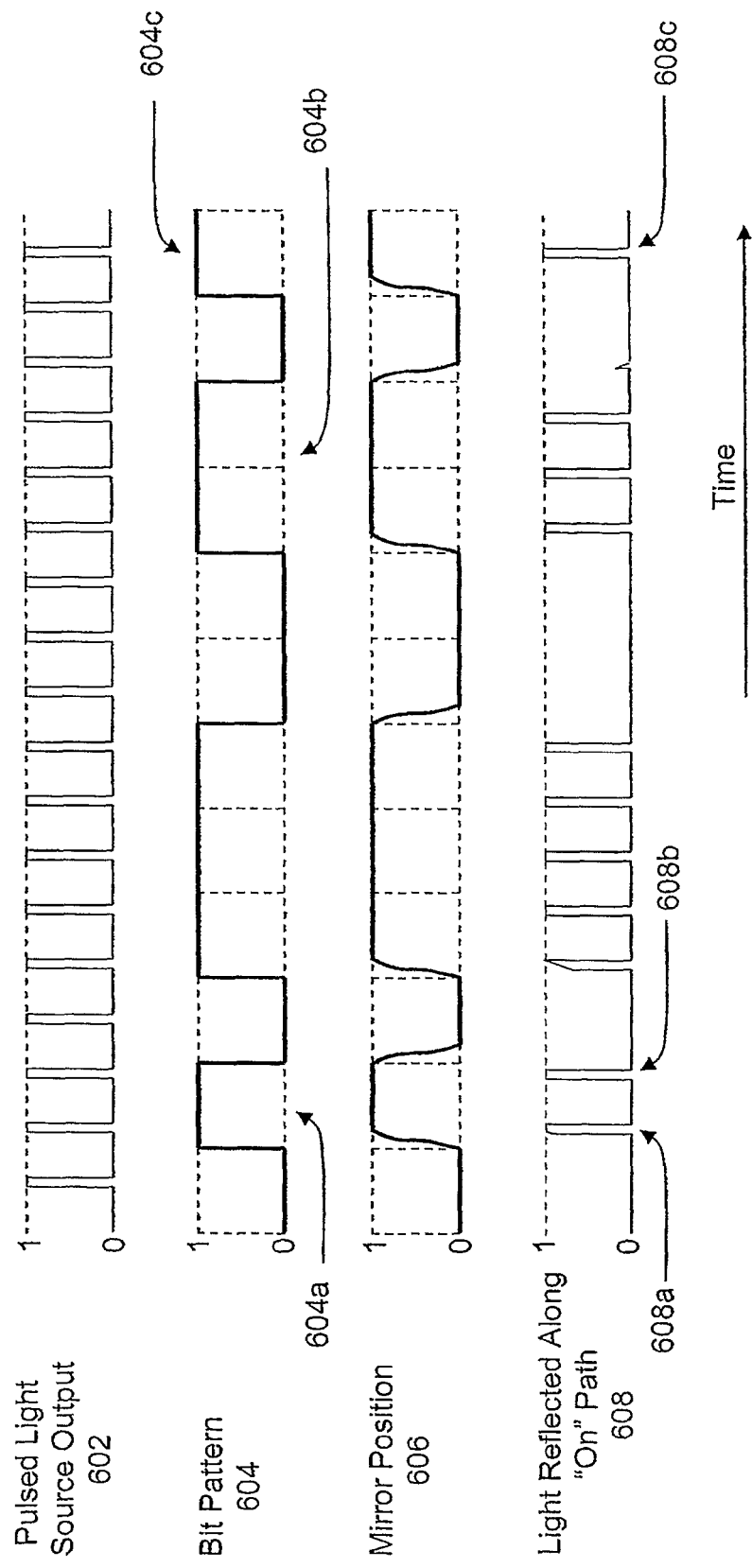
FIG. 6 illustrates schematically an example of a light waveform that is output by the display system of FIG. 3.

FIG. 6 illustrates an example timing diagram showing light that is reflected by an individual mirror element in a DMD device 305, 307, 309 of the display system of FIG. 3.

The pulsed output of the light source 303 is illustrated as 602 and is a square wave with a fixed frequency and mark-space ratio and is independent of the binary fields generated by the driver circuit 404. The output of the light source alternates between being fully on and fully off at a light source pulse frequency.

In this example, any light source may be used that can be switched on and off at a high enough frequency to be switched on and off during a minimum period of time that a mirror element can remain on. The light source pulse frequency of the pulsed light source output is greater than the mirror element switching frequency although in other embodiments the light source pulse frequency of the pulsed light source output can be less than the mirror switching frequency. In some examples, the light source may comprise a separate laser or LED for each of the desired colours (red, green and blue) as these components can be capable of switching speeds that are sufficiently fast to be suitable for the display system of the invention.

An example binary field control signal is illustrated as bit pattern 604. The bit pattern 604 is used to control the position of a mirror element on a DMD between an "on" and an "off" state. Each bit of the bit pattern 604 represents a minimum mirror on (and off) time.

The mirror position as controlled by the bit pattern 604 is illustrated as 606. The mirror position 606 is not a perfectly square waveform as there is a time delay between the mirror being actuated and the mirror reaching its intended position, and this is caused by the mechanical nature of the switching operation as illustrated in FIG. 5.

The light that is reflected by the mirror along an "on" path towards the screen 301 is illustrated as 608 and is a function of the mirror position 606 and the pulsed light source output 602.

It will be appreciated that the amount of light that is reflected for a single bit 604*a* of the bit pattern 604 with the pulsed light source output 602 is less than the amount of light that would be reflected for a single bit of the same bit pattern 604 used with a continuous light source of the same intensity. Similarly, the difference between the amount of light that is reflected for a single "on" bit 604*a* and a double "on" bit 604*b* is less for a system having a pulsed light source 602. Therefore, the difference between the amount of light reflected by adjacent grey scale shades of colour is reduced and the grey scale resolution is improved.

The amount of light that is reflected by the mirror along the on-path is not necessarily linearly related to the length of time that the mirror element is in the on position. This is due to the fact that the light source output 602 and the bit pattern 604 are not synchronised/phase locked with each other in this embodiment and that the number of light pulses that are reflected whilst the mirror element is in the on position for a given time is not necessarily the same on each occasion that the mirror element is on for that given time.

The number of light source output pulses that are reflected along the "on" path for a single mirror-on time slot is not always the same due to the inconsistent phase difference between the pulsed light source output 602 and the bit pattern 604.

For example, see the two single mirror-on timeslots 604*a*, 604*c* illustrated in FIG. 6. Two pulsed light source output pulses 608*a*, 608*b* are reflected along the "on" path for the first single on bit 604*a* in the bit pattern 604, whereas one light source output pulse 608*c* is reflected along the "on" path for the second single on bit 604*c*.

In some examples, partial light source output pulses may be reflected along the "on" path if they happen to coincide with the time that a mirror position is changing.

The relationship between the length of time that an individual mirror is on and the amount of light that is reflected by the mirror is more close to a linear relationship for longer mirror on times than shorter mirror on times. This is because the effect of the lack of synchronisation is reduced for longer mirror on times as the relative difference between the number of light source output pulses that are reflected is reduced. For example, between 5 and 6 light pulses may be reflected for a triple on bit, compared with between 1 and 2 light pulses for a single on bit. A single light source output pulse represents 17% (1 out of 6) of the maximum possible light reflected for a triple on bit compared with 50% (1 out of 2) for a single on bit.

In addition, the proportional period of time taken switching the mirror between on and off positions is reduced when the mirror is on for a longer time.

The non-linear nature of the average amount of light that is reflected along the "on" path for short mirror on times further improves the grey scale resolution for dark grey scale colours. This relationship is illustrated graphically in FIG. 7, and is described below.

Figure 7:
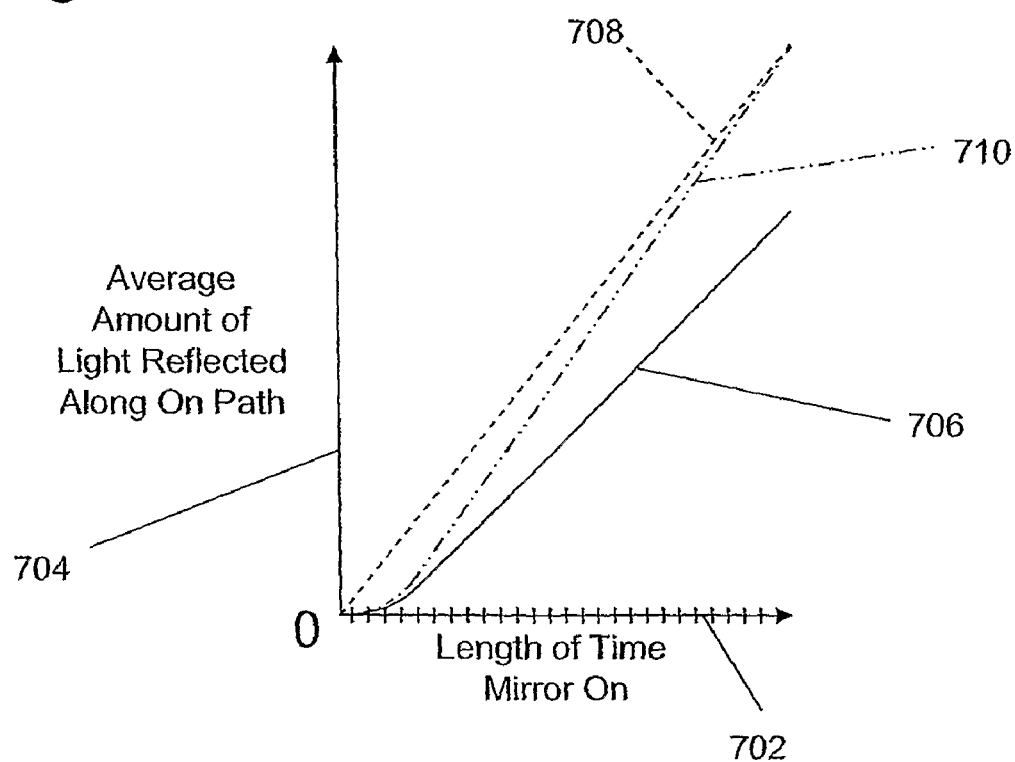
FIG. 7 illustrates graphically the amount of light that is output by the display system of FIG. 3.

FIG. 7 illustrates graphically the average amount of light that is reflected along the "on" path by a mirror against the length of time that the mirror is continuously on. The length of time that a mirror can be continuously on is a discrete value that is a multiple of the minimum mirror on time.

The average amount of light that is reflected by a mirror in the system of FIG. 3 is plotted on the graph as line 706. It will be appreciated that the line represents an average value of the light reflected, because an inconsistently reproducible amount of light is reflected by the mirror in this embodiment as discussed above.

By way of comparison the amount of light reflected by a mirror in a prior art system that uses a continuous light source is shown as dashed line 708.

The gradient of the lines 706, 708 on the graph of FIG. 7 represents the grey scale resolution of the associated system. A steeper line represents less grey scale resolution than a shallow line as the difference in the amount of light that can be reflected for discrete increments in mirror on time is higher.

The overall slope/gradient of the amount of light reflected by the system of FIG. 3 706 is less than the slope of the amount of light reflected by a prior art system 708 and this is indicative of an increase in grey scale resolution.

Furthermore, the slope of the amount of light reflected by the system of FIG. 3 706 is reduced for short mirror on times which improves the grey scale resolution for dark colours. This is due to the increased effect of the inconsistent number of light source output pulses that are reflected for short on-times when compared with the effect for long on-times.

In some embodiments, the intensity of the light generated by the pulsed light source can be higher than the light generated by prior art systems that use a continuous light source such that the amount of light reflected along the on path by a prior art system and the system illustrated in FIG. 6 is the same for the maximum mirror on time. In such embodiments, an improvement in grey scale resolution is provided for short mirror on times where the plot of light reflected along the on path is non-linearly related to the length of mirror on-time. This is illustrated in FIG. 7 as line 710. There may be a reduction in grey scale resolution for lighter shades of colour as the gradient of the line 710 is steeper than for the corresponding prior art system represented by line 708 when the mirror is on for longer. This reduction in grey scale for lighter shades of colour may be considered acceptable as the human eye is less perceptible to detecting grey scale changes for light shades of colour.

The improved grey scale resolution for dark shades can be considered as resulting from the statistical likelihood that the timing of the light source output pulses overlap with short mirror on-times. A short mirror on-time may be considered as a single on bit, two on bits, five on bits or any number of on bits wherein the proportional variance of the amount of light that is reflected for that on-time is noticeable to the human eye.

In some embodiments, the driver circuit 404 may be configured to manipulate the generation of the binary bit field control signal to provide further improvements to the grey scale resolution obtainable by the display system 300. For example, driver circuit 404 may replace groups of adjacent on bits in a binary field control signal with single/shorter on bits that are spaced apart to take further advantage of the improved grey scale resolution for short mirror on times.

As illustrated in FIG. 7, increasing the number of single (or shorter) on bits can further improve the grey scale resolution as the average amount of light transmitted for these relatively short times provides a genuine increase in achievable grey scale resolution.

Figure 8:
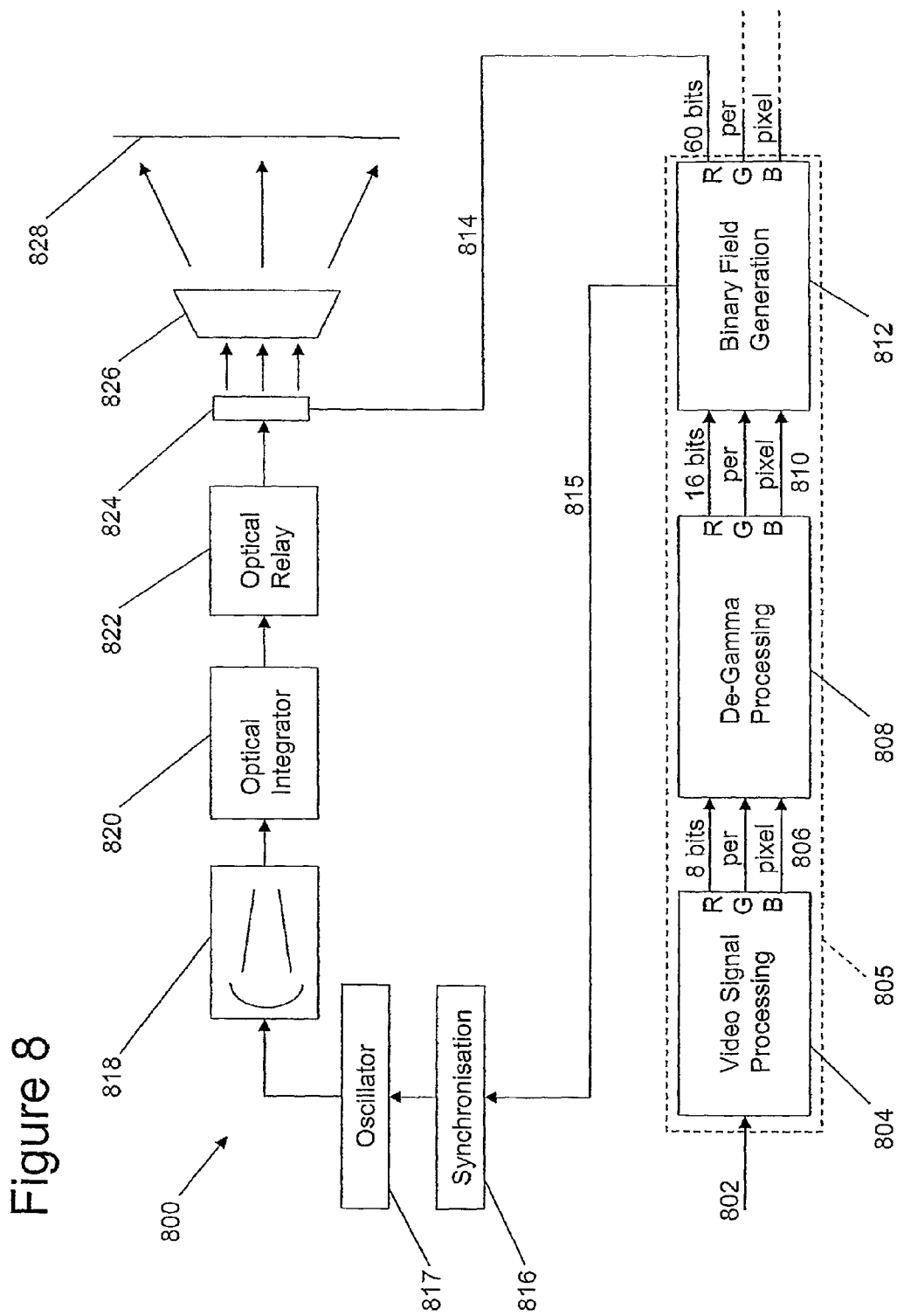
FIG. 8 is a schematic diagram of a display system according to another embodiment of the invention.

FIG. 8 illustrates a display system 800 according to another embodiment of the invention. In this embodiment, the system has three pulsed light sources, one for each of red, green and blue light. In FIG. 8 only the red light source 818 and optical processing components that are configured to optically process red light are shown in order to aid clarity.

The outputs of the light sources 818 are synchronised with the binary field control signals 814 that control the positions of the mirror elements in the DMD's 824.

Gamma decoding (de-gamma) processing is performed in order to manipulate the generation of the binary field control signal to improve the grey scale of the generated image as it will be perceived by the human eye.

The display system 800 comprises a video signal processing component 804, a de-gamma processing component 808 and a binary field generation component 812 that are configured to sequentially process a received analogue video signal 802 and generate binary field control signals 814 that are used to switch mirror elements in a DMD 824 on and off. The video signal processing component 804, de-gamma processing component 808 and binary field generation component 812 together can be considered as an embodiment of a driver circuit 805.

The display system 800 also comprises a synchronisation component 816, an oscillator 817, a red light source 818, an optical integrator 820, an optical relay 822, a DMD 824, and a lens 826. These components are configured to project red light onto a display screen 828 in accordance with the red binary field control signal 814 generated by the binary field generation component 812.

It will be appreciated that corresponding light sources, optical integrators, optical relays, DMD's and lenses are provided for projecting green and blue light onto the screen 828 respectively. In some embodiments, one or more of the components may be shared for projecting the different coloured light onto the screen 828, for example the same lens 826 may be used to focus the red, green and blue light onto the screen 828.

An analogue input signal 802 representative of video images that are to be displayed on display screen 828 is received at the video signal processing component 804.

The video signal processing component 804 is configured to perform analogue to digital conversion of the received analogue signal 802. The video signal processing component 804 then performs sync detection on the converted digital signal to control the stability of the video images that will be displayed and also de-interlaces and re-sizes the signal in order to standardise the format of the digital video signals that are output by the video signal processing component 804.

In this embodiment, for each pixel in the image the video signal processing component 804 outputs three 8 bit digital signals 806, one for each of the three primary colours red, green and blue (RGB). In other embodiments, the video signal processing component 804 may output three 10 bit digital signals 806, or digital signals 806 of any other length.

Each of the 8 bit digital signals 806 output by the video signal processing component 804 are provided as inputs to a de-gamma processing component 808. The de-gamma processing component 808 maps data into a more perceptually uniform domain for displaying on the screen 828. This can improve the perceptual performance for a limited signal range, such as the limited number of bits available for representing each RGB component generated by the video signal processing component 804.

In this embodiment, the de-gamma processing component 808 uses a look up table (LUT) to translate 8 bit digital input signals 806 into 16 bit digital output signals 810 for each RGB component. In other embodiments a 10 bit input signal may be translated into an 18 bit output signal by the de-gamma processing component 808.

The 16 bit digital signals 810 generated by the de-gamma processing component 808 are provided to the binary field generation component 812. The binary field generation component 812 translates each of the 16 bit signals 810 into a corresponding 60 bit binary field control signal 814 that will be used to switch a mirror element in a DMD 824 on and off.

A 60 bit control signal is generated for each mirror element, and each mirror element corresponds to a pixel that is to be displayed on the screen 828. Each of the 60 bits in the control signal 814 represents a sub-division in time of that pixel in a frame.

The binary field generation component 812 also generates a synchronisation signal 815 that is used by the synchronisation component 816 to control the timing of the oscillator 817 such that the light output generated by the pulsed light source 818 is synchronised with the binary field control signal 814. In some embodiments, the synchronisation component 816 and the oscillator 817 may be the same component.

The synchronisation signal 815 may provide the synchronisation component 816 with an indication of the start of each binary field, the start of each bit within a binary field, or any other indicator that the synchronisation component 816 can use to ensure that the pulsed light generated by the light source 818 is synchronised/phase locked with the switching of mirror elements in the DMD 824 as controlled by the binary field control signal 814.

Synchronising the light source 818 with the mirror elements on the DMD 824 can ensure that the amount of light reflected by a mirror element whilst it is in the on position is consistently reproducible, and does not significantly vary due to a different number of light pulses being reflected by the mirror element for a given time. This is in contrast to some of the embodiments described above, where the light source and mirror element are not synchronised and the amount of light reflected by the mirror element is not consistently reproducible.

As with the embodiment illustrated in FIG. 6, the oscillator 817 is used to control the output of the light source 818. The light generated by light source 818 passes through optical components, in this example an optical integrator 820 and an optical relay 822 before illuminating the DMD 824. The light reflected by mirror elements on the DMD 824 along an on-path passes through lens 826 and onto the display screen 828.

Figure 9:
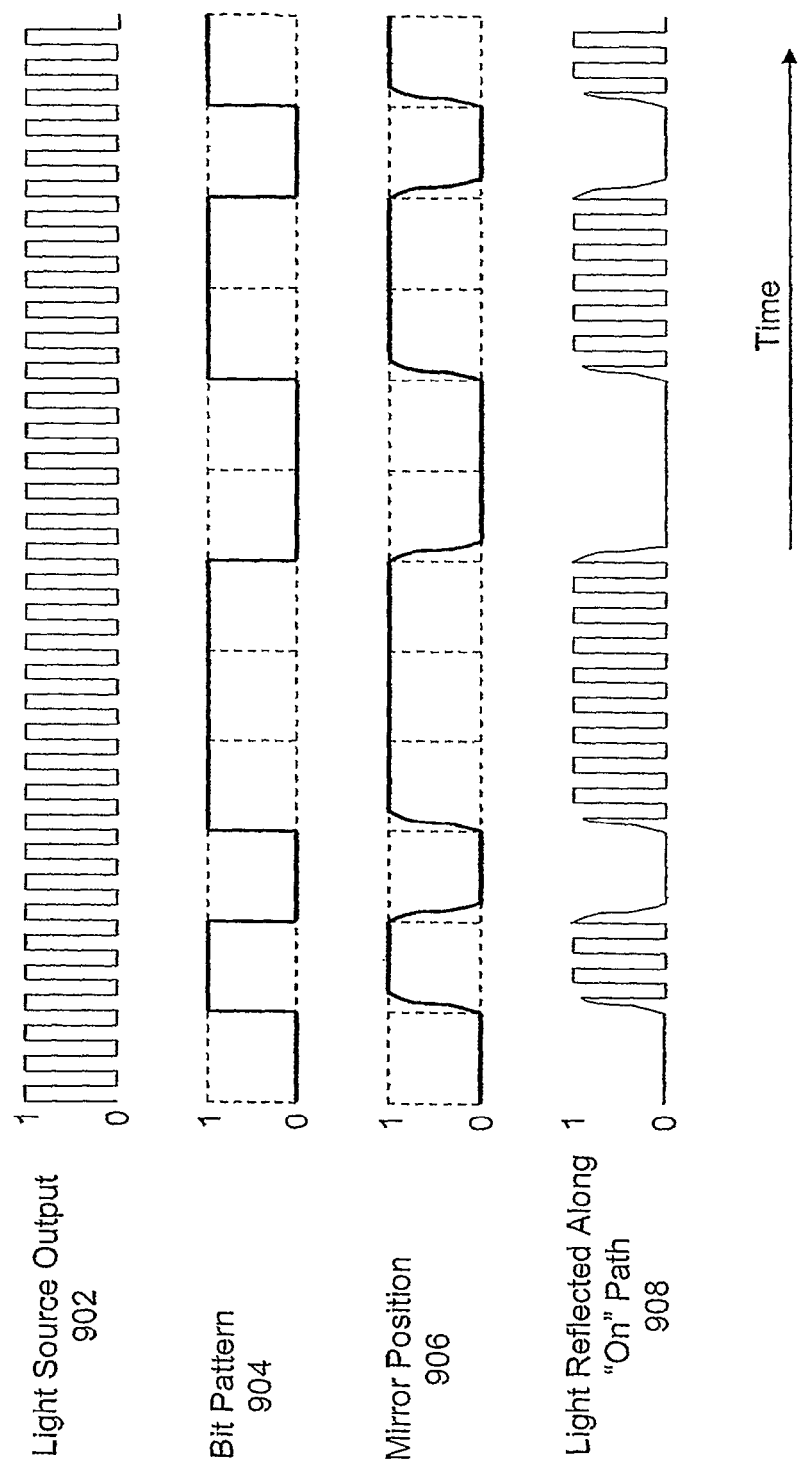
FIG. 9 illustrates schematically an example of light that is output by the display system of FIG. 8.

FIG. 9 illustrates an example timing diagram showing light that is reflected by an individual mirror element in the DMD device 824 of the display system 800 of FIG. 8.

In this example, the pulsed light source output 902 is synchronised with the bit pattern 904, and the light source pulse frequency of the pulsed light source output 902 is higher than the frequency of the bit pattern 904. Due to the synchronisation, a consistent number of light source output 902 pulses (in this example, four) occur for each single on bit in the bit pattern 904. As a result, each on bit consistently causes the same amount of light during a mirror position transition to be reflected along the on path 908.

Figure 10:
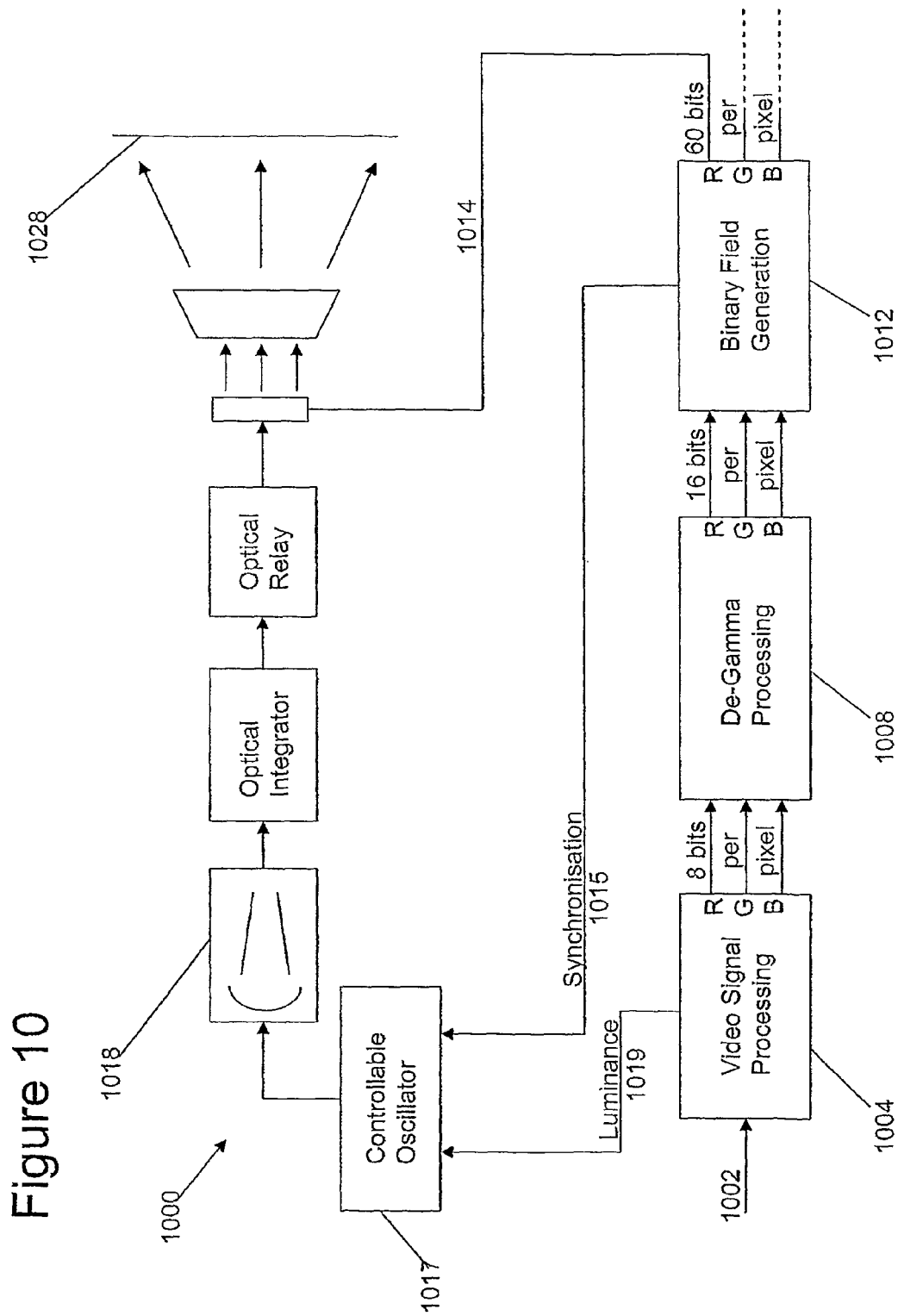
FIG. 10 is a schematic diagram of a display system according to another embodiment of the invention.

FIG. 10 shows a further embodiment of a display system 1000 according to an embodiment of the invention. Components of the display system 1000 of FIG. 10 that are also present in the display system 800 of FIG. 8 will not be described again in detail here. In this embodiment, a controllable oscillator 1017 is used to switch the light source 1018 on and off.

In this embodiment, the output of the light source 1018 is controlled so as to improve the quality of the image that is displayed on the screen 1028. In particular, by adjusting properties of the light that is output onto the display screen 1028 to take into account the dynamic range of a person who is looking at the image on the display screen 1028.

Dynamic range is a term used in the technical field of optics to describe the ratio between the smallest and largest possible values of light that the human eye can detect. For example, a person can see objects in low light such as by starlight and can also see objects in bright sunlight, even though on a moonless night objects can receive $\frac{1}{1,000,000,000}$ of the illumination they would on a bright sunny day. This corresponds to a dynamic range of 90 dB. However, a person cannot perform these feats of perception at both extremes of the scale at the same time. The eyes take time to adjust to different light levels. The dynamic range of the human eye without any adjustment of the pupil is approximately 30 dB.

The upper and lower boundaries of the dynamic range of a person when viewing an image will depend upon the brightness of the image, and this embodiment of the invention can cause the grey scale resolution for a particular image to be improved for shades that are within the dynamic range of a person viewing that image. The system of FIG. 10 can automatically give precedence to improving the grey scale resolution in a dynamic range that is determined as appropriate for the overall brightness of the image that is being displayed.

The controllable oscillator 1017 receives a luminance signal 1019 from the video signal processing component 1004 and a synchronisation signal 1015 from the binary field generation component 1012.

The luminance signal 1019 represents the overall brightness of the image that is to be displayed, and in this embodiment is a representation of a percentage value for the brightness of the image.

The controllable oscillator 1017 is configured to compare the brightness of the image as determined from the luminance signal 1019 with one or more threshold values. The frequency and/or mark-space ratio of the pulsed signal that actuates the light source 1018 is then set in accordance with whether or not the one or more of the thresholds are exceeded.

In one example, a single threshold value may be used by the controllable oscillator 1017. If the overall brightness of the image that is to be displayed exceeds that threshold value then the image as a whole is considered "bright", whereas if the threshold is not exceeded the image as a whole is considered "dark".

The controllable oscillator 1017 output signal may be configurable such that it causes the light source 1018 to generate more light per unit time for brighter scenes than for darker scenes. For displaying bright images this may be achieved by generating a light source output signal with a higher frequency of output pulses per unit time and/or by generating an output signal with a higher mark-space ratio than is used for displaying dark images, and vice versa.

Modulating the output of the light source 1018 in this way can improve the grey scale resolution for darker shades at the expense of the grey scale resolution for lighter shades when displaying dark images. This may be deemed acceptable as the human eye more readily detects differences in grey scale for dark shades when viewing a dark image. Also, when dark images are being displayed the dynamic range of the human eye causes the equality of those darker shades to be more discernible to a human, and therefore any deterioration in the grey scale resolution for lighter shades may not be as perceptible to the human eye.

In other examples, a plurality of threshold values can be used such that a plurality of frequency and/or mark-space ratio values for the controllable oscillator 1017 output signal can be used to provide further control of the grey scale resolution for images having different overall brightness.

In some embodiments, the intensity of the light source can be adjusted in accordance with the brightness of the image that is to be displayed to generate more light per unit time for bright images and less light per unit time for dark images.

In further embodiments, modulation of the light source 1028 through use of the controllable oscillator 1017 can be used to provide the functionality of gamma decoding. Modulating the light source in this way can enable the display system 1000 to control the light output onto the display screen 1028 to improve the grey scale of an image as it is perceived by the human eye. In such embodiments, a separate de-gamma processing component 1008 may not be required.

In further embodiments still, the synchronisation signal 1015 generated by the binary field generation component 1012 also comprises information relating to the specific binary field control signals 1014 that has been generated for the image that is to be displayed.

In such embodiments, the controllable oscillator 1017 may be configured such that it can dynamically adjust the frequency and/or mark-space ratio of the oscillator output signal that is used to drive the light source 1018 in accordance with the brightness of the image as determined from the binary field control signals 1014 that has been generated for the image/frame. Further still, the light source 1018 may not be turned on at all by the controllable oscillator 1017 if none of the mirror elements are switched on at that time.

In addition to an improvement in grey scale as described above, such an embodiment can provide an efficient display system as power is not wasted by activating a light source when all of the light generated by that light source is going to be reflected into a beam dump and not reflected onto the display screen.

This embodiment of the invention can adjust the short term average light output by the light source 1018 on a scene dependent basis.

Embodiments of the invention described herein can also be used in liquid crystal display (LCD) systems It will be appreciated that whilst the particular colour display system described above by way of example incorporates three separate light modulators, one for each colour red, green and blue with the modulators operating in parallel, the invention is equally applicable to sequential colour display systems that use a colour wheel or similar device for changing the colour of the light in a controlled manner.

Insofar as embodiments of the invention described above are implementable, at least in part, using a software-controlled programmable processing device such as a general purpose processor or special-purposes processor, digital signal processor, microprocessor, or other processing device, data processing apparatus or computer system it will be appreciated that a computer program for configuring a programmable device, apparatus or system to implement the foregoing described methods, apparatus and system is envisaged as an aspect of the present invention. The computer program may be embodied as any suitable type of code, such as source code, object code, compiled code, interpreted code, executable code, static code, dynamic code, and the like. The instructions may be implemented using any suitable high-level, low-level, object-oriented, visual, compiled and/or interpreted programming language, such as C, C++, Java, BASIC, Perl, Matlab, Pascal, Visual BASIC, JAVA, ActiveX, assembly language, machine code, and so forth. A skilled person would readily understand that term "computer" in its most general sense encompasses programmable devices such as referred to above, and data processing apparatus and computer systems.

Suitably, the computer program is stored on a carrier medium in machine readable form, for example the carrier medium may comprise memory, removable or non-removable media, erasable or non-erasable media, writeable or re-writeable media, digital or analog media, hard disk, floppy disk, Compact Disk Read Only Memory (CD-ROM), Company Disk Recordable (CD-R), Compact Disk Rewriteable (CD-RW), optical disk, magnetic media, magneto-optical media, removable memory cards or disks, various types of Digital Versatile Disk (DVD) subscriber identify module, tape, cassette solid-state memory. The computer program may be supplied from a remote source embodied in the communications medium such as an electronic signal, radio frequency carrier wave or optical carrier waves. Such carrier media are also envisaged as aspects of the present invention.

The invention claimed is:

1. A display system comprising a light source and a plurality of switchable elements wherein each element is switchable at an element switching frequency in accordance with an element control signal between an "on" state in which light is directed from the light source onto a display, and an "off" state in which light is not directed onto a display, wherein the light source is configured to generate a pulsed light source output at a light source pulse frequency that is greater than the element switching frequency, and the number of light source output pulses reflected by an element while it is in the "on" state for a predetermined time is not the same for each occasion that the element is in the "on" state for that predetermined time so that the rate at which the amount of light reflected by the element increases with the length of time the element is in the "on" state increases with the length of time that the element is in the "on" state for short on times.

2. The system of claim 1, wherein the light source pulse frequency is different to the element switching frequency.

3. The system of claim 1, wherein the instantaneous phase difference between the pulsed light source output and the element control signal changes over time.

4. The system of claim 1, wherein the element control signal comprises a plurality of bits having "on" bits and "off" bits, and the system is configured to replace consecutive on bits in the element control signal with spaced apart on bits.

5. The system of claim 4, configured to reduce the time that an element is continuously on.

6. The system of claim 1, wherein the light source is configured to receive a luminance signal representative of a brightness value of an image to be displayed and to modulate the pulsed light source output in accordance with the luminance signal.

7. The system of claim 1, configured to modulate the pulsed light output in accordance with the element control signal.

8. The system of claim 6, configured to adjust one or more of the frequency, mark-space ratio, and intensity of the pulsed light output to modulate the pulsed light output.

9. The system of claim 6, wherein the light source is configured to generate more light per unit time for an image that has a brightness value above a threshold than for an image that has a brightness value below a threshold value.

10. The system of claim 6, configured to modulate the pulsed light output to perform a gamma decoding operation on a received video signal.

11. The system of claim 1, wherein the plurality of switchable elements is a deflectable mirror device (DMD).

12. A television comprising the system of claim 1.

13. A method of operating a display system comprising a light source and a plurality of switchable elements, the method comprising:
the light source generating a pulsed light source output at a light source pulse frequency; and
switching an element of the plurality of switchable elements at an element switching frequency in accordance with an element control signal between an "on" state in which light is directed from the light source onto a display, and an "off" state in which light is not directed onto a display wherein the light source pulse frequency is greater than the element switching frequency, and the number of light source output pulses reflected by an element while it is in the "on" state for a predetermined time is not the same for each occasion that the element is in the "on" state for that predetermined time so that the rate at which the amount of light reflected by the element increases with the length of time the element is in the "on" state increases with the length of time that the element is in the "on" state for short on times.

14. The method of claim 13, wherein the light source pulse frequency is different to the element switching frequency.

15. The method of claim 13, further comprising changing the instantaneous phase difference between the pulsed light source output and the element control signal over time.

16. The method of claim 13, wherein the element control signal comprises a plurality of bits having "on" bits and "off" bits, and the method further comprises replacing consecutive on bits in the element control signal with spaced apart on bits.

17. The system of claim 16, further comprising reducing the time that an element is continuously on.

18. The method of claim 13, further comprising:
receiving a luminance signal representative of a brightness value of an image to be displayed; and
modulating the pulsed light source output in accordance with the luminance signal.

19. The method of claim 13, further comprising modulating the pulsed light output in accordance with the element control signal.

20. The method of claim 18, wherein modulating the pulsed light output comprises adjusting one or more of the frequency, mark-space ratio, and intensity of the pulsed light output.

21. The method of claim 18, further comprising the light source generating more light per unit time for an image that has a brightness value above a threshold than for an image that has a brightness value below a threshold value.

22. The method of claim 18, wherein modulating the pulsed light output comprises performing a gamma decoding operation on a received video signal.

23. The method of claim 13, wherein the plurality of switchable elements is a deflectable mirror device (DMD).

24. A non-transitory computer-readable program elements for configuring the display system of claim 1.

25. A non-transitory carrier medium carrying a computer program according to claim 24.

26. A non-transitory carrier medium according to claim 25, wherein said carrier medium is a one of the following: solid-state memory; magnetic memory; CD-ROM; digital versatile disk (DVD); HD-DVD; read-write CD; Blu-ray Disk.

* * * * *